United States Patent
Bruckner et al.

[11] 3,772,533
[45] Nov. 13, 1973

[54] TRAPEZOIDAL WAVEFORM GENERATOR CIRCUIT

[75] Inventors: Ronald L. Bruckner, Dayton; Don P. Rex, Springboro, both of Ohio

[73] Assignee: The National Cash Register Company, Dayton, Ohio

[22] Filed: June 9, 1972

[21] Appl. No.: 261,272

[52] U.S. Cl................ 307/261, 307/228, 307/229, 307/263, 328/127
[51] Int. Cl. ............................................ H03k 5/00
[58] Field of Search.................... 307/228, 229, 261, 307/263; 328/127

[56] References Cited
UNITED STATES PATENTS

| | | | |
|---|---|---|---|
| 3,312,837 | 4/1967 | Flynn et al...................... | 307/228 X |
| 3,586,874 | 6/1971 | Ferro................................. | 307/228 |
| 3,125,694 | 3/1964 | Palthe............................... | 307/228 |
| 3,444,394 | 5/1969 | Colvson............................ | 307/228 X |
| 3,453,452 | 7/1969 | Starr, Jr............................. | 307/263 |
| 3,543,049 | 11/1970 | Farnsworth........................ | 307/228 |
| 3,548,219 | 12/1970 | Lawrie, Jr. et al.................. | 307/263 |

*Primary Examiner*—Stanley D. Miller, Jr.
*Attorney*—J. T. Cavender et al.

[57] ABSTRACT

There is disclosed a ramp generator responsive to a pulse-type signal for providing an output signal which linearly ramps between two voltage values. The ramp generator includes an operational amplifier integrator circuit and a pair of feedback regulating paths around the integrator circuit to regulate the output voltage values.

6 Claims, 2 Drawing Figures

TRAPEZOIDAL WAVEFORM GENERATOR CIRCUIT

This invention relates to an electrical circuit for generating a ramp voltage and more particularly to a circuit utilizing an operational amplifier as part of an integrator circuit and regulating feedback for generating the ramp voltage.

In many machines it is common to have digital pulse-type signals cause motor driven apparatus to operate. As used herein, the term "pulse-type signal" means any signal in which the voltage changes in a substantially instantaneous manner from one value to another value. "Pulse-type signal" is not intended to limit the time during which the voltage remains at either value, or the number of times it changes, but only the time required for the change. One example of such motor-driven apparatus is the automatic line finder circuit used with a printing device which is controlled by pulse-type signals. In this type of apparatus, it is necessary that the acceleration and deceleration of the motor be closely controlled. Where the pulse-type signals normally associated with the apparatus are used to turn the motor on or off, the motor becomes very temperature and parameter sensitive. It has been found that if the motor is turned on and off using a ramp signal, control of the acceleration and deceleration becomes much easier. As used herein, the term "ramp signal" means any signal in which the voltage changes from one to another value in a time substantially longer than the time required for the change in a pulse-type signal. Further, if the voltage change of the ramp signal is linear with respect to time, improved control is possible.

Many ramp generator circuits are known to exist. The simplest ramp generator is merely a capacitor which is slowly changed to an operating potential. However, this provides a nonlinear ramp voltage. An integrator circuit provides a linear ramp voltage and may be constructed by connecting a capacitor between the output and inverting input of an operational amplifier. One such integrator is shown in U.S. Pat. No. 3,586,874 entitled "Integrated Circuit Periodic Ramp Generator" by Armand P. Ferro.

When using a ramp generator circuit to drive a motor, it is further desirable to regulate the voltages applied to the motor. This further adds to the ease of controlling the apparatus the motor is driving.

In accordance with one aspect of this invention there is provided a circuit which, in response to a pulse-type signal, provides a voltage which linearly ramps between a first voltage value and a second voltage value in response to the leading edge of the pulse-type signal and which linearly ramps between the second voltage value and the first voltage value in response to the trailing edge of the pulse-type signal. The circuit comprises inverting amplifying means having an input and an output with the pulse-type signal being applied to the input thereof. Further, the circuit includes capacitance means coupled between the input and the output. In addition there is a first switching means having first and second terminals which are respectively direct current coupled to the input and the output, with the first switching means becoming conductive when the voltage at the output becomes the first value. Similarly, there is included a second switching means having first and second terminals which are respectively direct current coupled to the input and the output, with the second switching means becoming conductive when the voltage at the output becomes the second value.

A detailed description of one preferred embodiment of this invention will hereinafter be given with reference being made to the following FIGURES, in which.

Figure 1:
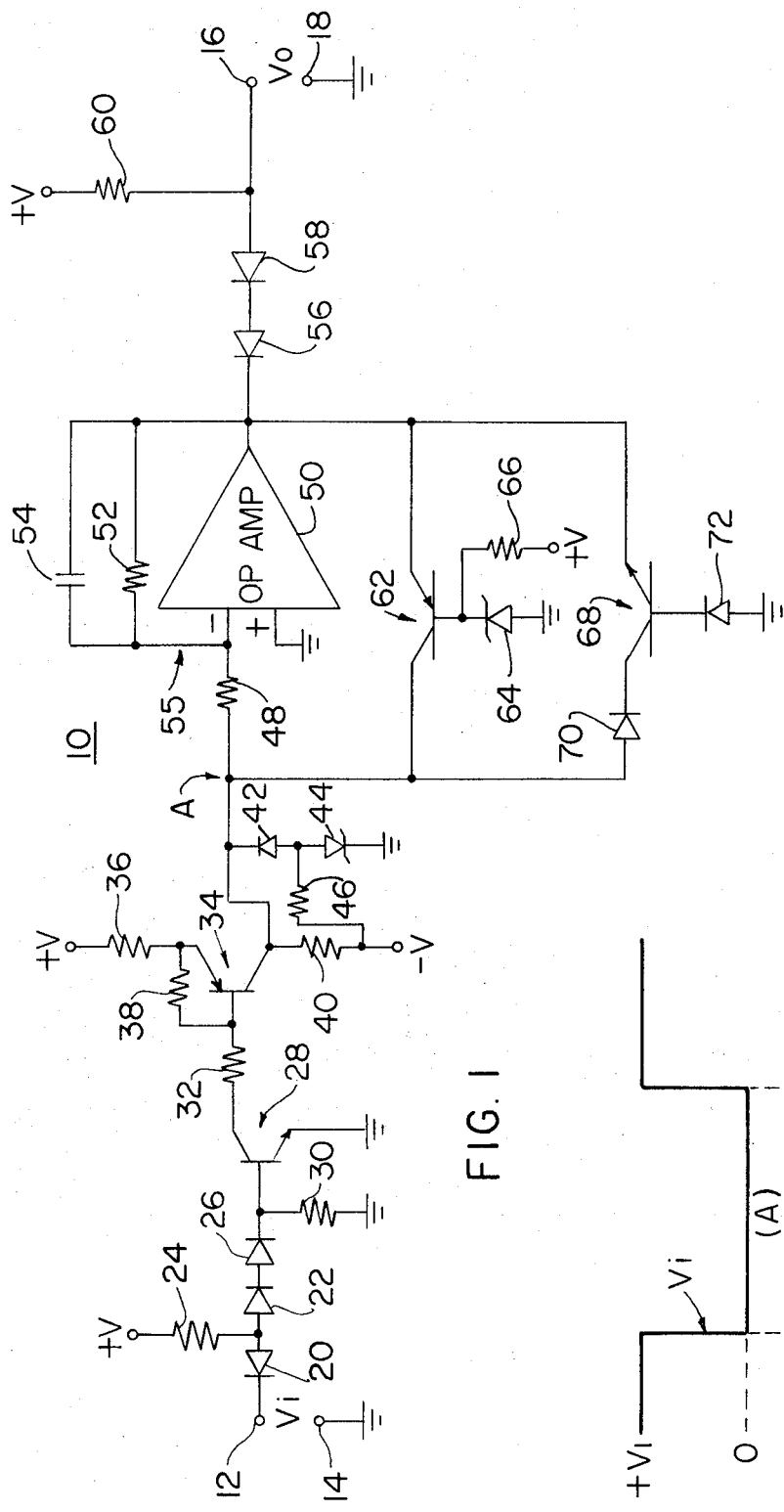
FIG. 1 is a circuit diagram of a ramp generator utilizing this invention.
Figure 2:
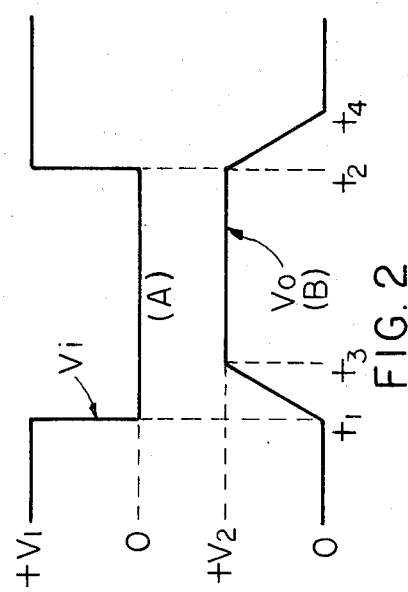
FIGS. 2A and 2B show two voltage waveforms representing the input and output voltage of the circuit shown in FIG. 1.

Referring now to FIG. 1, a ramp generator circuit 10 is shown, and includes a pair of input terminals 12 and 14, between which a pulse-type input signal $V_i$ having polarities of $+V_1$ volts and zero volts is applied. The input signal $V_i$ is shown in FIG. 2A, where it is seen that the voltage is zero volts between times $t_1$ and $t_2$ and $+V_1$ volts otherwise. In this embodiment, it is desired that the motor (not shown) be turned on at time $t_1$ and be turned off at time $t_2$, with predictable acceleration and deceleration times respectively following times $t_1$ and $t_2$. For the input voltage $V_i$ shown in FIG. 2A, earlier occurring time $t_1$ is the leading edge and later occurring time $t_2$ is the trailing edge of the pulse-type input signal. Ramp generator circuit 100 also includes two output terminals 16 and 18 between which the ramping output voltage $V_o$ is provided. Output voltage $V_o$ alternates between zero volts and $+V_2$ volts with a linear ramping voltage between these two values. Output voltage $V_o$ is shown in FIG. 2B where it is seen that the value thereof linearly increases between times $t_1$ and $t_3$ and linearly decreases between times $t_2$ and $t_4$.

Input terminal 14 is coupled to a point of reference potential, such as ground. Input terminal 12 is coupled to the cathode of a diode 20, the anode of which is coupled to the anode of a diode 22. The junction of the anodes of diodes 20 and 22 is coupled through a resistor 24 to a point of positive voltage +V. The cathode of diode 22 is coupled to the anode of a diode 26, the cathode of which is coupled to the base of an NPN transistor 28. The junction of the cathode of diode 26 and the base of transistor 28 is coupled through a resistor 30 to ground. The emitter of transistor 28 is also coupled to ground.

The collector of transistor 28 is coupled through a resistor 32 to the base of a PNP transistor 34. The emitter of transistor 34 is coupled through a resistor 36 to a point of positive voltage +V. The emitter of transistor 34 is also coupled through a resistor 38 to the base of transistor 34. The collector of transistor 34 is coupled through a resistor 40 to a point of negative voltage −V. The collector of transistor 34 is also coupled to the cathode of a diode 42, the anode of which is coupled to an anode of a zener diode 44. The cathode of zener diode 44 is coupled to ground. The junction of the anode of diode 42 and zener diode 44 is coupled through a resistor 46 to the point of negative potential −V.

The collector of transistor 34 is also coupled through junction A to one end of an input resistor 48, the other end of which is coupled to the inverting input of an operational amplifier 50. The noninverting input of operational amplifier 50 is coupled to ground. Operational amplifier 50 may be any amplifier exhibiting a high gain which would exceed 1000, but which may be many times this value and further which has an extremely high input impedance. One operational amplifier which has been found acceptable is the μA709 operational amplifier which may be purchased from several different sources. A description of a μ A709 operational amplifier is given in the Oct. 16, 1967 issue of Electronic's Magazine on pages 86–93.

The output of operational amplifier 50 is coupled through a resistor 52 to the inverting input thereof. A capacitor 54 is coupled in parallel with resistor 52. The combination of operational amplifier 50, resistors 48 and 52 and capacitor 54 is an integrator circuit 55 in which the voltage appearing at the output of operational amplifier 50 is the integral of the voltage at junction A. Thus, where a voltage at junction A is a pulse-type voltage which increases from zero volts to a positive voltage substantially instantaneously, the output voltage from operational amplifier 50 will be a linear ramp voltage. The slope of the ramp will be determined by the time constant of resistor 48 and capacitor 54. The gain of the integrator will be determined by the ratio of resistors 52 and 48.

The output of operational amplifier 50 is coupled to the cathode of a diode 56, the anode of which is coupled to the cathode of a diode 58. The anode of diode 58 is coupled through a resistor 60 to the source of positive voltage +V. The junction of resistor 60 and the anode of diode 58 is coupled to output terminal 16. Output terminal 18 is coupled to ground.

The output of operational amplifier 50 is also coupled to the emitter of a PNP transistor 62. The collector of transistor 62 is coupled to junction A. The base of transistor 62 is coupled to the cathode of a zener diode 64, the anode of which is coupled to ground. The junction between the cathode of zener diode 64 and the base of transistor 62 is coupled through a resistor 66 to a point of positive potential +V. The output of operational amplifier 50 is further coupled to the emitter of an NPN transistor 68. The collector of transistor 68 is coupled to the cathode of a diode 70, the anode of which is coupled to junction A. The base of transistor 68 is coupled to the cathode of a diode 72, the anode of which is coupled to ground.

The operation of ramp generator circuit 10 will now be explained. When the input voltage $V_i$ changes from the positive value $+V_1$ volts to zero volts at time $t_1$, transistor 28 becomes nonconductive. This, in turn, causes transistor 34 to become nonconductive and the collector of transistor 34 becomes negative. The negative voltage at the collector of transistor 34 is determined by the voltage drop across the zener diode 44 and diode 42. This negative voltage, when applied between junction A and ground, causes the output of operational amplifier 50 to begin ramping positive, with a slope determined by the values of the resistor 48 and capacitor 54. When, at time $t_3$, the voltage at the output of operational amplifier 50 reaches the voltage $V_2$ determined by zener diode 64 and the base-emitter voltage drop of transistor 62, transistor 62 begins conducting. This allows positive voltage to be fed back to junction A thereby forcing junction A more positive and causing the ramp voltage to level off at $V_2$. Thus, whenever the output voltage of the operational amplifier 50 exceeds the $V_2$ threshold voltage, transistor 62 becomes conductive to make the input voltage less negative, and whenever the output voltage of operational amplifier 50 is less than the $V_2$ threshold voltage, transistor 62 becomes nonconductive and the output voltage will rise to the $V_2$ threshold voltage. Thus, transistor 62 regulates the output voltage. The voltage between output terminals 16 and 18 will be the voltage between the output of operational amplifier 50 and ground, plus the voltage drop across diodes 56 and 58.

The output voltage from operational amplifier 50 will remain substantially constant until time $t_2$ when the input voltage $V_i$ changes from zero volts to $+V_1$ volts. In this case, transistor 28 becomes conductive, causing transistor 34 to become conductive. The values of resistors 36 and 40 are selected so that the normal voltage expected at the collector of transistor 34 will exceed the voltage across zener diode 64 and the collector-base junction of transistor 62. However, zener diode 64 and the collector base junction of transistor 62 limit the voltage at the collector of transistor 34, and hence at junction A, to this positive value. With this voltage at junction A, the output of operational amplifier 50 begins linearly ramping in a negative direction towards zero volts with a slope determined by resistor 48 and capacitor 54. This action continues until the voltage at the output of operational amplifier 50, and hence at the emitter of transistor 68, falls below the voltage drop across diode 72 and the base-emitter junction of transistor 68, which will be in the order of $-1.2$ volts. This is the time $t_4$ in FIG. 2B and at this time, transistor 68 begins conducting and junction A becomes more positive due to the current flowing through diode 70 and conductive transistor 68. In this manner transistor 68 regulates the low voltage output of operational amplifier 50. In this case the output voltage between terminals 16 and 18 will be approximately zero volts due to the voltage drop of approximately 1.2 volts across diodes 56 and 58.

In one circuit which has been constructed according to this embodiment, the following component values were used:

Resistor 24—8.2K ohm
Resistor 30—1.5K ohm
Resistor 32—6.8K ohm
Resistor 36—560 ohm
Resistor 38—7.5K ohm
Resistor 40—3.3K ohm
Resistor 46—1.1K ohm
Resistor 48—24K ohm
Resistor 52—1.5M ohm
Resistor 60—20K ohm
Resistor 66—1.2K ohm
Diode 20—IN907
Diode 22—IN907
Diode 26—IN907
Diode 42—IN907

Diode 56—IN907
Diode 58—IN907
Diode 70—IN907
Diode 72—IN907
Zener Diode 44—3.6 volts
Zener Diode 64—6.2 volts
Capacitor 54—0.39 μf
Transistor 28—2N3904
Transistor 34—2N3906
Transistor 62—2N3906
Transistor 68—2N3904
Operational Amplifier 50—μ A709
+V—+12volts
−V—−12 volts
$+V_1$—+5 volts

What is claimed is:

1. A circuit which in response to a pulse-type signal provides a voltage which linearly ramps between a first voltage value and a second voltage value in response to the leading edge of said pulse-type signal and which linearly ramps between said second voltage value and said first voltage value in response to the trailing edge of said pulse-type signal, said circuit comprising:

inverting amplifying means having an input and an output, said pulse-type signal being applied to said input;

capacitance means coupled between said input and said output;

first switching means having two terminals respectively direct current coupled to said input and said output, wherein said first switching means includes a solid state device having first and second main electrodes, each coupled respectively to one of said two terminals thereof and a control electrode coupled to a point of first fixed potential, said solid state device of said first switching means allowing current to flow between said output and said input whenever the voltage as said output becomes said first voltage value;

second switching means having two terminals respectively direct current coupled to said input and said output, wherein said second switching means includes a solid state device having first and second main electrodes each coupled respectively to one of said two terminals thereof and a control electrode coupled to a point of second fixed potential, said solid state device of said second switching means allowing current to flow between said input and said output whenever the voltage at said output becomes said second voltage value;

wherein said solid state device of said first switching means is a PNP transistor having a base, an emitter and a collector, said base being coupled to said point of first fixed potential, said emitter being coupled to said output, and said collector being coupled to said input; and wherein said solid state device of said second switching means is an NPN transistor having a base, an emitter, and a collector, said base being coupled to said point of second fixed potential, said emitter being coupled to said output, and said collector being coupled to said input.

2. The invention according to claim 11:
wherein said amplifying means is an operational amplifier; and
wherein said circuit further includes a first resistor coupled between said input and said output and a second resistor coupled between said input and the terminals of said first and second switching means remote from said output.

3. The invention according to claim 2 wherein said input signal is applied to said amplifying means through said second resistor.

4. The invention according to claim 2 wherein the slope of said ramp between said first and second voltage values and between said second and first voltage values is determined by the values of said capacitance means and said second resistor.

5. The invention according to claim 1 wherein said inverting amplifying means includes first and second resistors and an operational amplifier having an output which is coupled to said amplifying means output and an input, said first resistor being coupled between said operational amplifier input and output, and said second resistor being coupled between said inverting amplifying means input and the inverting input of said operational amplifier.

6. A circuit comprising:
an operational amplifier having an inverting input, a noninverting input, and an output;
a capacitor coupled between said output and said inverting input;
a first resistor coupled between said output and said inverting input;
a second resistor having a first end coupled to said inverting input and further having a second end constituting an input to said circuit;
a PNP transistor having a base, an emitter and a collector;
means for coupling said emitter to said output;
means for coupling said collector to said second end of said second resistor;
means for coupling said base to a point of first potential;
an NPN transistor having a base, an emitter and a collector;
means for coupling said emitter to said output;
means for coupling said collector to said second end of said second resistor;
means for coupling said base to a point of second potential; and
means for applying a pulse type voltage to said second end of said second resistor.

* * * * *

UNITED STATES PATENT OFFICE
CERTIFICATE OF CORRECTION

Patent No. 3,772,533                    Dated November 13, 1972

Inventor(s) Ronald L. Bruckner & Don P. Rex

It is certified that error appears in the above-identified patent and that said Letters Patent are hereby corrected as shown below:

Column 5, line 29, delete "11" and substitute --1--.

Signed and sealed this 14th day of May 1974.

(SEAL)
Attest:

EDWARD M. FLETCHER, JR.
Attesting Officer

C. MARSHALL DANN
Commissioner of Patents